United States Patent
Thubert et al.

(10) Patent No.: US 9,883,382 B2
(45) Date of Patent: Jan. 30, 2018

(54) DYNAMICALLY HASHED MAC ADDRESS FOR TRANSMISSION IN A NETWORK

(71) Applicant: Cisco Technology, Inc., San Jose, CA (US)

(72) Inventors: Pascal Thubert, La Colle Sur Loup (FR); Eric Michel Levy-Abegnoli, Valbonne (FR); Patrick Wetterwald, Mouans Sartoux (FR); Jean-Philippe Vasseur, Anchorage, AK (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 194 days.

(21) Appl. No.: 14/873,292

(22) Filed: Oct. 2, 2015

(65) Prior Publication Data
US 2017/0099662 A1 Apr. 6, 2017

(51) Int. Cl.
*H04L 29/06* (2006.01)
*H04W 12/00* (2009.01)
*H04W 80/02* (2009.01)

(52) U.S. Cl.
CPC ......... *H04W 12/00* (2013.01); *H04L 63/0407* (2013.01); *H04L 63/0876* (2013.01); *H04W 80/02* (2013.01)

(58) Field of Classification Search
CPC ............. H04L 63/0876; H04L 63/0407; H04L 63/0414
See application file for complete search history.

(56) References Cited

U.S. PATENT DOCUMENTS

| | | | |
|---|---|---|---|
| 8,271,687 B2 | 9/2012 | Turner et al. | |
| 9,674,703 B2* | 6/2017 | Raman | H04W 12/06 |
| 2008/0209071 A1* | 8/2008 | Kubota | H04L 29/06 709/238 |
| 2012/0213211 A1* | 8/2012 | Remaker | H04L 63/0421 370/338 |
| 2016/0080380 A1* | 3/2016 | Dawoud Shenouda Dawoud | H04L 63/0876 713/156 |
| 2016/0302058 A1* | 10/2016 | Mestanov | H04L 61/2038 |

OTHER PUBLICATIONS

Thubert, Ed., "An Architecture for IPv6 over the TSCH mode of IEEE 802.15A", Internet Draft, [online], May 12, 2015, [retrieved on Sep. 15, 2015]. Retrieved from the Internet: <URL: https://toolsietf.org/pdf/draft-ietf-6tisch-architecture-08.pdf>, pp. 1-42.

(Continued)

*Primary Examiner* — Christopher Crutchfield
(74) *Attorney, Agent, or Firm* — Leon R. Turkevich (57) ABSTRACT

In one embodiment, a method comprises: generating, by a transmitting network device, a hashed source media access control (MAC) address and a hashed destination MAC address based on hashing a MAC address of the transmitting network device and a destination MAC address of a destination wireless network device, respectively, relative to an epochal transmission sequence value; and transmitting a data frame at a time slot associated with the epochal transmission sequence value, using the hashed source MAC address and the hashed destination MAC address, to the destination wireless network device.

18 Claims, 5 Drawing Sheets

(56) References Cited

OTHER PUBLICATIONS

Hardie et al., "Pervasive Surveillance of the Internet—Designing Privacy into Internet Protocols", [online], IEEE 802 Tutorial, Jul. 14, 2014, [retrieved on Sep. 17, 2015]. Retrieved from the Internet: <URL: https://mentor.ieee.org/802-ec/dcn/14/ec-14/0043-01-00EC-internet-privacy-tutorial.pdf>, 47 pages.

Cooper et al., "Privacy Considerations for Internet Protocols", Internet Architecture Board, Request for Comments: 6973, Jul. 2013, pp. 1-36.

Watteyne et al., "Using IEEE 802.15.4e Time-Slotted Channel Hopping (TSCH) in the Internet of Things (IoT): Problem Statement", Internet Engineering Task Force, Request for Comments: 7554, May 2015, pp. 1-23.

Threatpost, "The first stop for security news" [online], 2015, [retrieved on Sep. 17, 2015]. Retrieved from the Internet: <URL: https://threatpost.com/research-finds-mac-address-hashing-not-a-fix-for-privacy-problems/104893/>, pp. 1-12.

Wikipedia, "MAC Spoofing", [online], Sep. 11, 2015, [retrieved on Sep. 15, 2015]. Retrieved from the Internet: <URL: https://en.wikipedia.org/w/index.php?title=MAC_spoofing&printable=yes>, 3 pages.

Thubert et al., "IETF 6TSCH: Combining IPv6 Connectivity with Industrial Performance", 2013 Seventh International Conference on Innovative Mobile and Internet Services in Ubiquitous Computing, IEEE, Jul. 3, 2013, XP032485811, pp. 541-546.

Thubert et al., U.S. Appl. No. 14/642,066, filed Mar. 9, 2015.

\* cited by examiner

DYNAMICALLY HASHED MAC ADDRESS FOR TRANSMISSION IN A NETWORK

TECHNICAL FIELD

The present disclosure generally relates to dynamically hashed media access control (MAC) addresses for transmission in a data network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

The Internet Engineering Task Force (IETF) is attempting to propose standards that can be applied to wireless devices for the stringent requirements of deterministic networks (e.g., minimal jitter, low latency, minimal frame loss). For example, Low power and Lossy Networks (LLNs) allow a large number (e.g., tens of thousands) of resource-constrained devices to be interconnected to form a wireless mesh network. The IETF has proposed a routing protocol ("6TiSCH") that provides IPv6 routing using time slotted channel hopping (TSCH) based on IEEE 802.15.4e, enabling LLN devices to use low-power operation and channel hopping for higher reliability. The 6TiSCH architecture specifies a Channel distribution/usage (CDU) matrix of "cells", each cell representing a unique wireless channel at a unique timeslot following an initial epochal time (T=0).

The STDS-802-Privacy group at IEEE is investigating privacy of MAC addresses to protect network devices from rogue devices that attempt to learn and exploit MAC addresses in a wireless data network. One proposal is to change a device MAC address each time the device attaches to a new wireless access point.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

In one embodiment, a method comprises: generating, by a transmitting network device, a hashed source media access control (MAC) address and a hashed destination MAC address based on hashing a MAC address of the transmitting network device and a destination MAC address of a destination wireless network device, respectively, relative to an epochal transmission sequence value; and transmitting a data frame at a time slot associated with the epochal transmission sequence value, using the hashed source MAC address and the hashed destination MAC address, to the destination wireless network device.

In another embodiment, an apparatus comprises a first circuit and a second circuit. The first circuit is configured for generating a hashed source media access control (MAC) address and a hashed destination MAC address based on hashing a MAC address of the apparatus and a destination MAC address of a destination wireless network device, respectively, relative to an epochal transmission sequence value. The second circuit is configured for transmitting a data frame at a time slot associated with the epochal transmission sequence value, using the hashed source MAC address and the hashed destination MAC address, to the destination wireless network device.

In another embodiment, one or more non-transitory tangible media are encoded with logic for execution by a machine, operating as a transmitting network device. The one or more non-transitory tangible media encoded with the logic, when executed by the machine, is operable for: generating, by the transmitting network device, a hashed source media access control (MAC) address and a hashed destination MAC address based on hashing a MAC address of the transmitting network device and a destination MAC address of a destination wireless network device, respectively, relative to an epochal transmission sequence value; and transmitting a data frame at a time slot associated with the epochal transmission sequence value, using the hashed source MAC address and the hashed destination MAC address, to the destination wireless network device.

DETAILED DESCRIPTION

Figure 1:
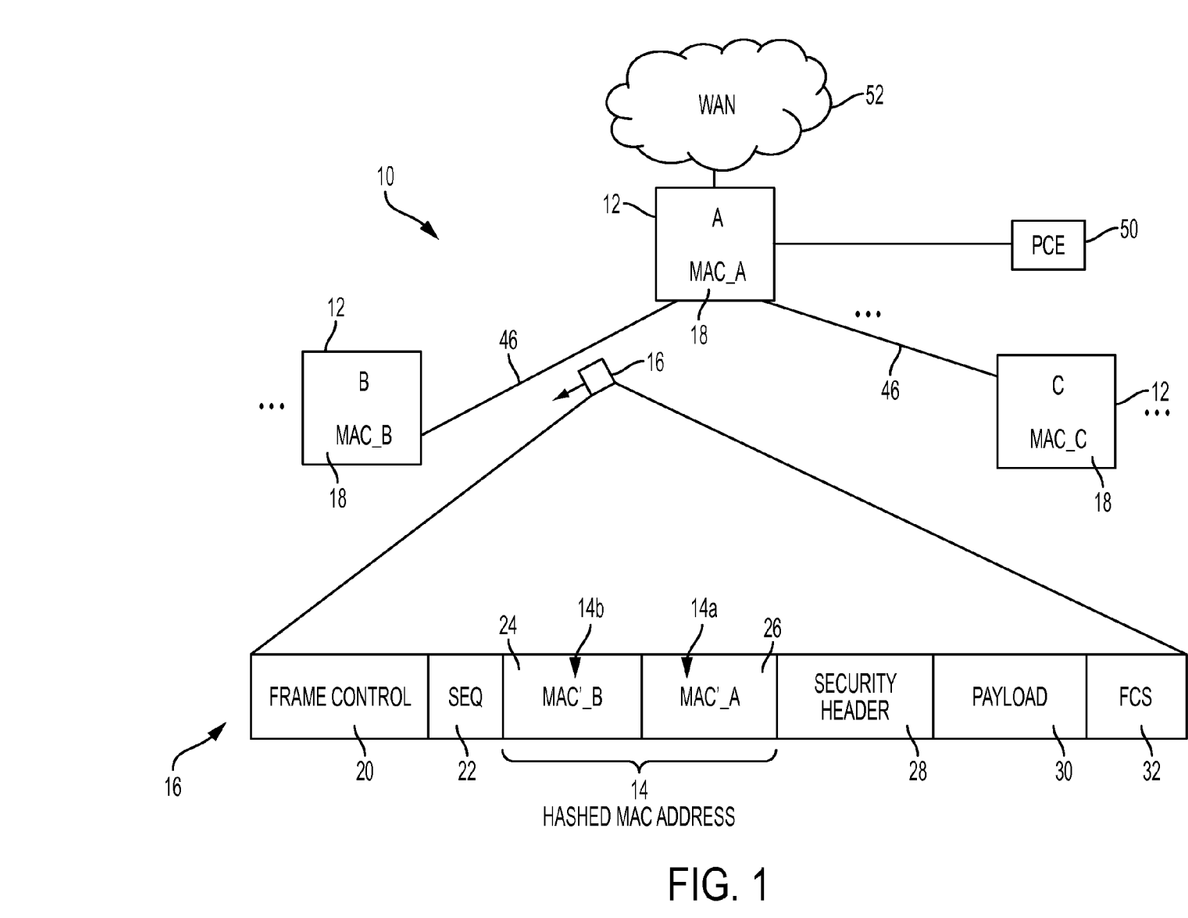
FIG. 1 illustrates an example system having an apparatus for generating hashed MAC addresses for transmission of data frames output by the apparatus to a destination wireless network device in a data network, according to an example embodiment.

FIG. 1 illustrates an example wireless data network 10 comprising an apparatus 12 (e.g., network devices "A", "B", "C") for generating hashed MAC addresses 14 (e.g., hashed source MAC address 14*a*, hashed destination MAC address 14*b*) for transmission of one or more data frames 16 output by the apparatus (e.g., "A") 12 to a destination wireless network device (e.g., "B") 12 in a wireless data network 10, according to an example embodiment. As illustrated in FIG. 1, each wireless network device (e.g., "A", "B", and "C") 12 has a corresponding prescribed MAC address (e.g., "MAC_A", "MAC_B", and "MAC_C") 18; the prescribed MAC address 18 can be programmed in the network device 12, for example by mask programming (i.e., "hard-wiring") by a manufacturer during manufacture of the network device 12; alternately the prescribed MAC address 18 could be programmed in non-volatile memory by the manufacturer and/or a network administrator having wired access to the network device 12. In other words, each prescribed MAC address 18 is "fixed" (i.e., unchangeable) to uniquely identify the corresponding network device 12. Although FIG. 1 shows only the network devices "A", "B", and "C", and the PCE 50, the wireless data network 10 can be an LLN that comprises more network devices (not shown), for example on the order of tens of thousands of network devices operating according to 6TiSCH.

Particular embodiments enable the network devices 12 in the wireless data network 10 to hide their prescribed MAC addresses 18 from detection and/or exploitation by a rogue network device, based on a transmitting network device (e.g., "A") 12 dynamically generating hashed MAC addresses 14 for each transmission of a data frame 16 based on the prescribed source and destination MAC addresses 18, and further based on an epochal transmission sequence value that identifies a time slot allocated for transmitting the data frame 16. The time slot can be allocated, for example, by a path computation element (PCE) 50 that can program the network devices 12 to operate according to a prescribed time slotted channel hopping sequence (e.g., according to 6TiSCH), described below with respect to FIG. 5.

The hashed source and destination MAC addresses 14 replace the prescribed MAC addresses 18 of source and destination network devices in a transmitted data frame 16, ensuring that any rogue network device cannot detect the prescribed MAC addresses 18 of the source or destination network devices. As illustrated in FIG. 1, the transmitted data frame 16 (e.g., a IEEE 802.15.4 MAC Protocol Data Unit (PDU) which is a payload of a Physical Layer (PHY) PDU) includes a MAC frame preamble field 20, contiguously followed by a sequence identifier field 22, contiguously followed by a destination MAC address field 24 containing the hashed destination MAC address "MAC'_B" 14b for the destination wireless network device "B" 12, and contiguously followed by a source MAC address field 26 containing the hashed source MAC address "MAC'_A" 14a of the source wireless network device "A" 12. Although not shown in FIG. 1, the destination MAC address field 24 can be preceded by a destination personal area network (PAN) identifier (ID) field, and the source MAC address field 26 can be preceded by a source PAN ID field. The source MAC address field 26 is contiguously followed by the remaining MAC frame fields, including for example a security header field 28, a payload field 30 (carrying, for example, an Internet Protocol (IP) data packet 30), and a frame check sequence field 32.

Figure 2:
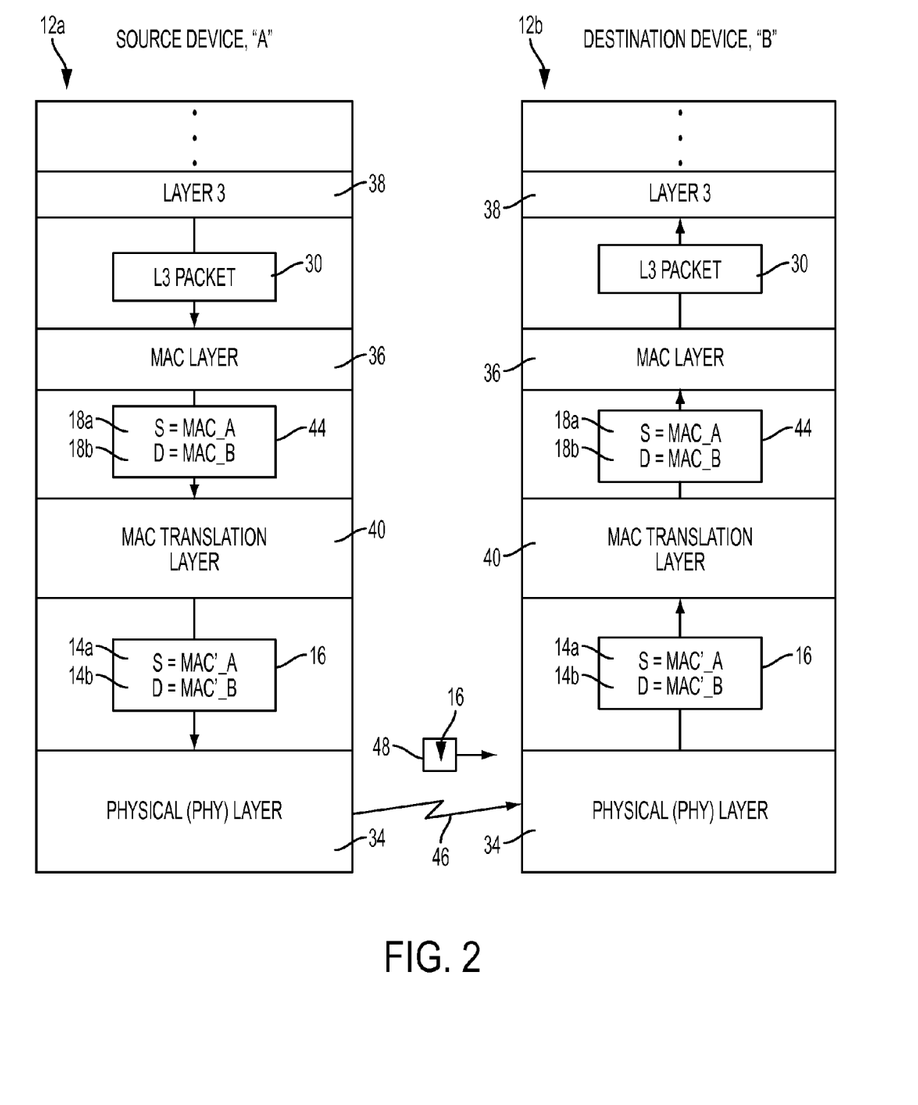
FIG. 2 illustrates in further detail the apparatus generating the hashed MAC addresses for transmission of the data frames to the destination wireless network device, according to the example embodiment.

FIG. 2 illustrates in further detail the transmitting network device "A" 12a generating the hashed MAC addresses 14a and 14b for transmission of the data frame 16 to the destination wireless network device "B" 12b, according to the example embodiment. FIG. 2 illustrates the network devices 12a and 12b with reference to the Open Systems Interconnecting (OSI) model, where each network device 12a and 12b can contain a physical (PHY) layer circuit 34 (Layer 1), a MAC layer circuit 36 (Layer 2), a network layer circuit 38 (Layer 3) (e.g., Internet Protocol layer), and additional upper layer circuits (not shown).

Figure 5:
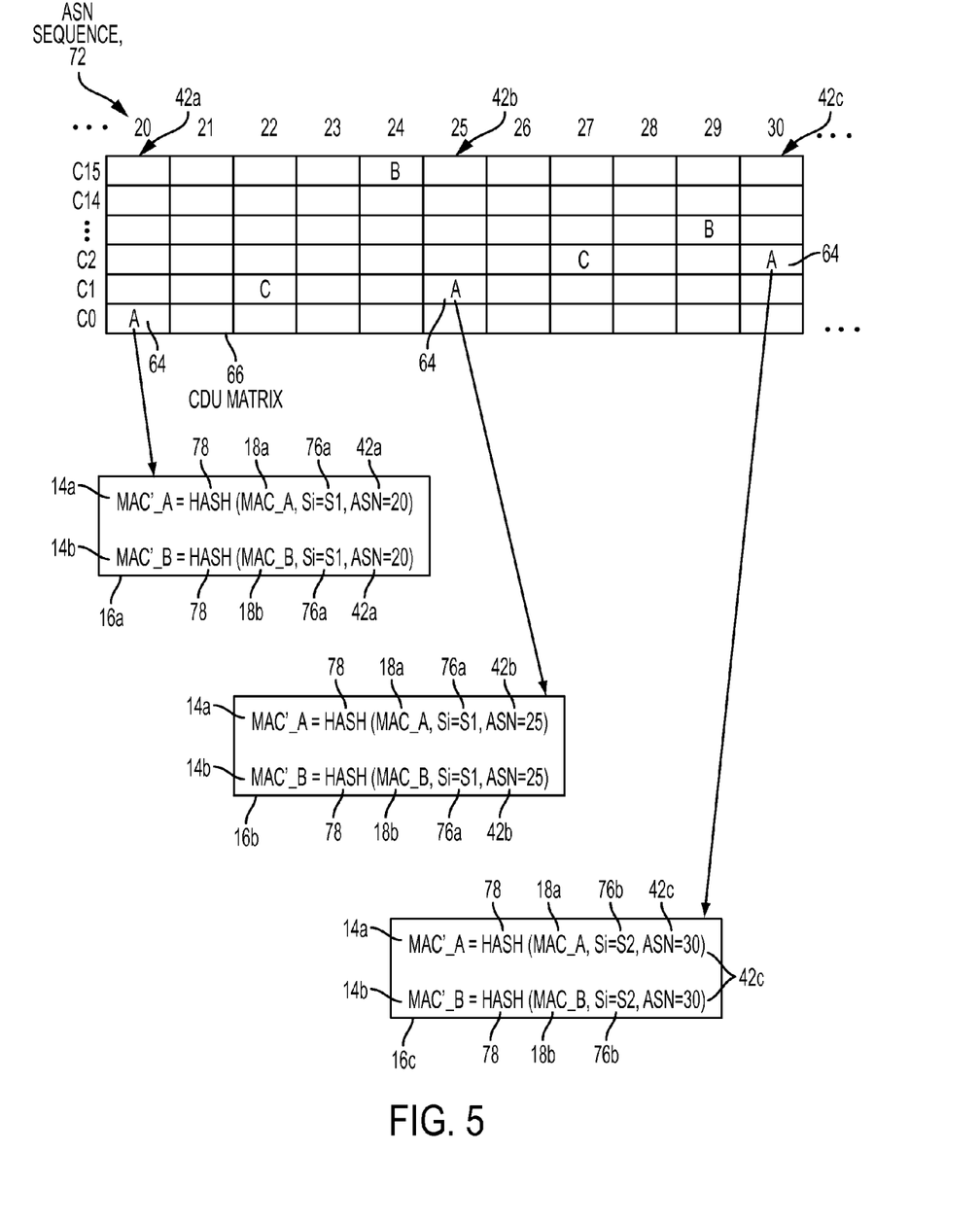
FIG. 5 illustrates in further detail the example generating the hashed MAC addresses based on a source and destination MAC address, a secret value, and an epochal transmission sequence value associated with the time slot used for transmission of the data frame, according to an example embodiment.

Each device 12 also can include a MAC translation layer circuit 40 in between the PHY layer circuit 34 and the MAC layer circuit 36: the MAC translation layer circuit 40 can be configured for generating a hashed source MAC address ("S=MAC'_A") 14a and a hashed destination MAC address ("D=MAC'_B") 14b based on hashing a prescribed source MAC address ("S=MAC_A") 18a of the transmitting (source) network device "A" 12a and a prescribed destination MAC address ("D=MAC_B") 18b of the destination wireless network device "B" 12b, respectively, relative to an epochal transmission sequence value (ETSV) 42, illustrated in FIG. 5 as an Absolute Slot Number (ASN) according to 6TiSCH, and a shared secret value ("Si"), described below. In one embodiment, the MAC translation layer circuit 40 can receive from the MAC layer circuit 36 an original (i.e., unmodified) MAC frame 44 specifying the prescribed source MAC address ("S=MAC_A") 18a of the transmitting network device "A" 12a and the prescribed destination MAC address ("D=MAC_B") 18b of the destination wireless network device "B" 12b.

The PHY layer circuit 34 in the transmitting network device "A" 12a can add the physical layer parameters (e.g., Preamble, Start of Frame Delimiter (SFD), and frame length) to the data frame 16, and output via a wireless data link 46 a PHY protocol data unit (PPDU) 48 containing the data frame 16 output by the MAC translation layer circuit 40. As described previously, the PHY layer circuit 34 of the transmitting network device 12a outputs the PPDU 48 (containing the transmitted data frame 16) at a time slot associated with the epochal transmission sequence value (e.g., the ASN) 42.

The PHY layer circuit 34 of the destination network device "B" 12b is configured for receiving the PPDU 48 (containing the transmitted data frame 16) from the transmitting network device "A" 12a at the corresponding time slot associated with the epochal transmission sequence value 42, for example allocated by the PCE 50 according to 6TiSCH. The PHY layer circuit 34 of the destination network device "B" 12b is configured for forwarding the received transmitted data frame 16 to the MAC translation layer circuit 40 in the destination network device "B" 12b.

The MAC translation layer circuit 40 in the destination network device "B" 12b is provided the parameters used to generate the hashed MAC addresses 14 (e.g., the prescribed source MAC address 18a, the epochal transmission sequence value 42 used to transmit the transmitted data frame 16 at the corresponding time slot, and the shared secret value "Si"), enabling the MAC translation layer circuit 40 in the destination network device "B" 12b to execute the same hashing operations on a given MAC frame 44 as executed by the corresponding MAC translation layer circuit 40 in the transmitting network device "A" 12a; hence, the MAC translation layer circuit 40 can recover (or verify) the original source address as the prescribed source MAC address 18a of the transmitting network device "A" 12a, and the original destination address as the prescribed destination MAC address 18b of the destination network device "B" 12b. For example, if a reversible (two-way) hash function is used, the MAC translation layer circuit 40 in the destination network device "B" 12b can apply the epochal transmission sequence value 42 and the shared secret value "Si" to the hashed MAC addresses 14a and 14b to recover the prescribed MAC addresses 18a and 18b; if a non-reversible (one-way) hash function is used to generate the hashed MAC addresses 14a and 14b, the MAC translation layer circuit 40 in the destination network device "B" 12b can verify the destination MAC address matches its prescribed MAC address "MAC_B" 18 based on determining whether the hashed destination MAC address 14b in the transmitted data frame 16 matches a hash of the prescribed MAC address "MAC_B" 18 of the destination network device "B" 12b with the current epochal transmission sequence value 42 and the shared secret value "Si".

Hence, the MAC translation layer circuit 40 of the destination network device "B" 12 can forward the original (recovered) MAC frame 44 to the MAC layer circuit 36 of the destination network device "B" 12b, enabling the MAC layer circuit 36 to process the original (recovered) MAC frame 44 based on having the destination address matching the prescribed MAC address "MAC_B" 18 of the destination network device 12*b*.

The MAC translation layer circuit 40 of the destination network device "B", in response to receiving an acknowledgement frame from the MAC layer circuit 36 during the same time slot as the transmitted data frame 16 (acknowledging receipt of the unmodified MAC frame 44), can generate and output during the same time slot a modified acknowledgement frame using the same hash parameters used by the transmitting network device "A" 12*a*. Hence, the MAC translation layer 40 in the transmitting network device "A" 12*a* can recover the acknowledgement frame that was transmitted within the same time slot as the transmitted data frame 16, enabling the MAC layer circuit 36 in the transmitting network device "A" 12*a* to receive the acknowledgement frame generated in response to receipt of the unmodified MAC frame 44.

Hence, the example embodiments prevent a rogue network device from performing any identification or correlation of any network device, as each MAC address 18 is changed for each and every transmission at a corresponding time slot. In contrast, prior methods for changing a MAC address each time a network device attached to a new wireless access point still left the network device vulnerable to attacks, as a rogue device could track the network activity of the network device during usage of the new MAC address over multiple transmissions while the network device was attached to the new wireless access point. Further, a single (static) hashing of a MAC address (i.e., using the same hash function and hash function parameters over time) is susceptible to a rogue device reverse-engineering the original MAC address over time.

Hence, the example embodiments can ensure that no MAC address is transmitted twice by a transmitting network device 12, enabling a transmitting network device 12 to maintain secure communications using dynamically hashed MAC addresses while hiding its prescribed (internal) MAC address 18. The example embodiments also enable a receiving network device to recover the original source and destination MAC addresses 18*a*, 18*b* from the hashed source and destination MAC addresses 14*a*, 14*b*, based on the receiving network device having possession of the same hash parameters used by the transmitting network device, and generate a secure acknowledgement identifying the received (unmodified) MAC frame and using the same hashed parameters as used by the transmitting network device 12.

Figure 3:
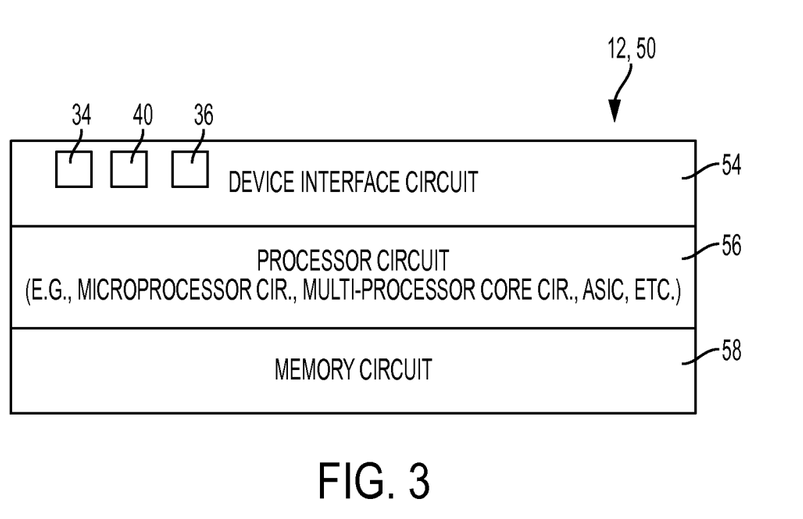
FIG. 3 illustrates an example implementation of any one of the network devices of FIG. 1, according to an example embodiment.

FIG. 3 illustrates an example implementation of any one of the devices 12, 50, FIG. 1, according to an example embodiment. Each apparatus 12, 50 is a physical machine (i.e., a hardware device) configured for implementing network communications with other physical machines via the network 10 (and/or a wide area network 52). The term "configured for" or "configured to" as used herein with respect to a specified operation refers to a device and/or machine that is physically constructed and arranged to perform the specified operation.

Each apparatus 12 and/or 50 can include a device interface circuit 54, a processor circuit 56, and a memory circuit 58. The device interface circuit 54 can include one or more distinct IEEE based transceivers for communications with the devices of FIG. 1 via any of the wireless data links 46. The device interface circuit 54 can include one or more physical layer circuits 34, one or more MAC translation layer circuits 40, one or more MAC layer circuits 36, etc.;

alternately, the circuits 34, 40, 36, 38, etc. of FIG. 2 can be integrated into a single integrated circuit in the device interface circuit 54.

The processor circuit 56 can be configured for executing any of the operations described herein, and the memory circuit 58 can be configured for storing any data (e.g., hash function parameters) or data frames as described herein. Any of the hash function parameters described herein with respect to FIG. 5, or the data frames 16 or 44, also can be stored in an internal memory circuit within any one of the MAC layer circuit 36, the MAC translation layer circuit 40, and or the PHY layer circuit 34.

Any of the disclosed circuits of the devices 12 and/or 50 (including the device interface circuit 54, the processor circuit 56, the memory circuit 58, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 58) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 58 can be implemented, for example, using a non-volatile memory such as a programmable read only memory (PROM) or an EPROM, and/or a volatile memory such as a DRAM, etc.

Further, any reference to "outputting a message" or "outputting a frame" (or the like) can be implemented based on creating the message/frame in the form of a data structure and storing that data structure in a non-transitory tangible memory medium in the disclosed apparatus (e.g., in a transmit buffer). Any reference to "outputting a message" or "outputting a frame" (or the like) also can include electrically transmitting (e.g., via wired electric current or wireless electric field, as appropriate) the message/frame stored in the non-transitory tangible memory medium to another network node via a communications medium (e.g., a wired or wireless link, as appropriate) (optical transmission also can be used, as appropriate). Similarly, any reference to "receiving a message" or "receiving a frame" (or the like) can be implemented based on the disclosed apparatus detecting the electrical (or optical) transmission of the message/frame on the communications medium, and storing the detected transmission as a data structure in a non-transitory tangible memory medium in the disclosed apparatus (e.g., in a receive buffer). Also note that the memory circuit 58 can be implemented dynamically by the processor circuit 56, for example based on memory address assignment and partitioning executed by the processor circuit 56.

Figure 4:
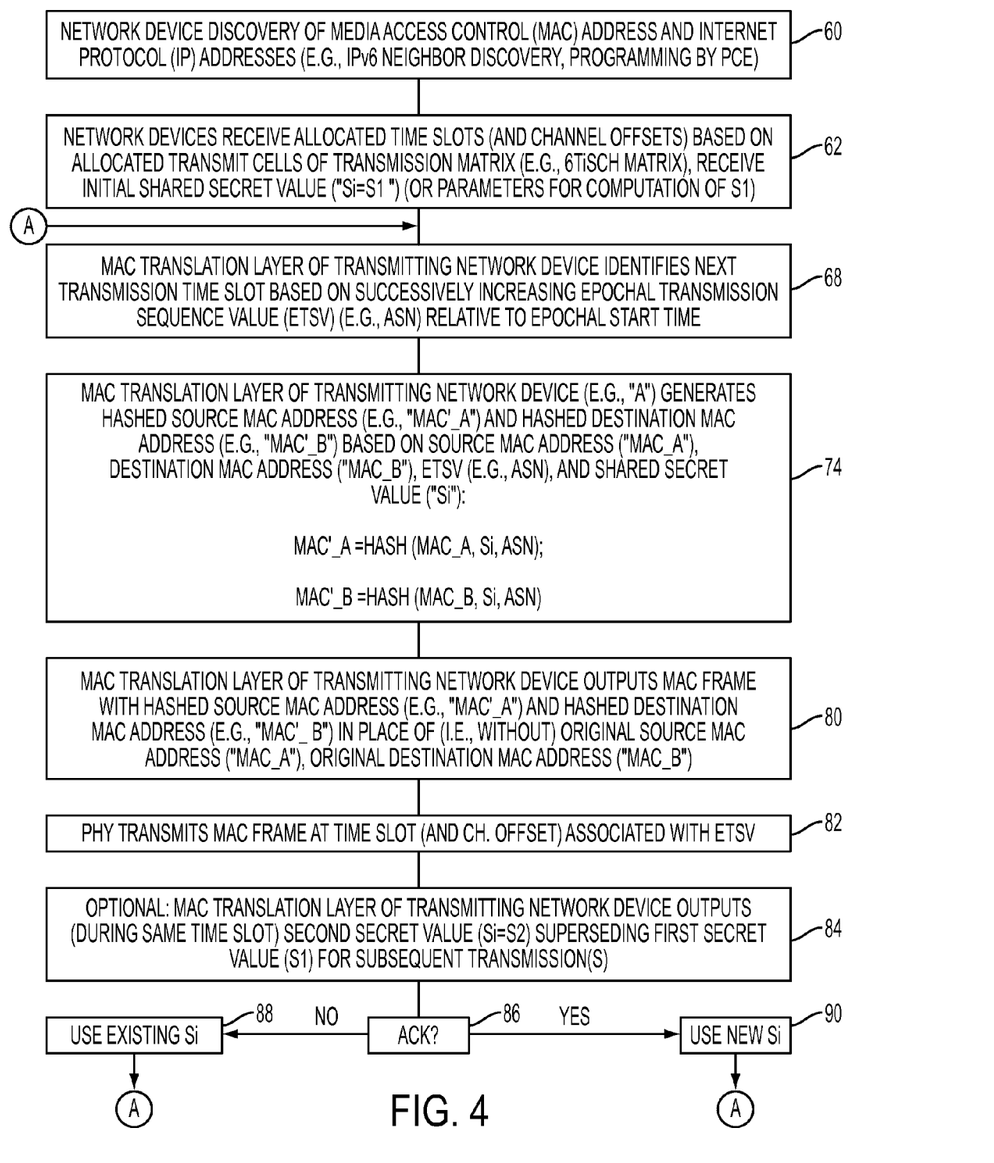
FIG. 4 illustrates an example method by the transmitting network device of FIGS. 1 and 2 generating the hashed MAC addresses for transmission of the data frames to the destination wireless network device, according to the example embodiment.

FIG. 4 illustrates an example method by the transmitting network device of FIGS. 1 and 2 apparatus generating the hashed MAC addresses for transmission of the data frames to the destination wireless network device, according to the example embodiment. FIG. 5 illustrates in further detail the example generating the hashed MAC addresses based on a source and destination MAC address, a secret value, and an epochal transmission sequence value associated with the time slot used for transmission of the data frame, according to an example embodiment.

The operations described with respect to any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

As shown in FIG. 4, the MAC layer circuit 36 of each network device 12 in operation 60 can perform network device discovery to identify the prescribed MAC address 18 and associated IP address for each network device 12 in the wireless data network 10, for example according to IPv6 Neighbor Discovery; alternately, the PCE 50 can program each of the MAC layer circuits 36 of each of the network devices 12 with the prescribed MAC address 18 and associated IP address of each prescribed MAC address 18. Hence MAC translation layer circuit 40 in each of the transmitting network device "A" 12*a* and the destination network device "B" 12*b* is able to determine the prescribed source MAC address "MAC_A" 18*a* of the transmitting network device 12*a*, and the prescribed destination MAC address "MAC_B" 18*b* of the destination network device "B" 12*b*.

Each network device 12 in operation 62 can receive (e.g., from the PCE 50) its allocated time slots (and channel offsets) based on the allocated transmit cells 64 from the channel distribution/usage (CDU) matrix 66 established, for example, by the PCE 50 in accordance with 6TiSCH. As illustrated in FIG. 5, the CDU matrix 66 specifies that the network device "A" can transmit at the time slots 42*a*, 42*b*, and 42*c* associated with the epochal transmission sequence values of ASN="20", "25", and "30", respectively, based on the CDU cells "(Channel Offset=C0; ASN=20)", "(Channel Offset=C1; ASN=25)", and "(Channel Offset=C2; ASN=30)".

Each network device 12 also can receive in operation 62 (e.g., from the PCE 50) an initial shared secret value "Si=S1" (e.g., 76*a* of FIG. 5), or parameters for computation of the secret value "Si". Each of the above-described parameters is accessible by the MAC translation layer circuit 40. Hence, the MAC translation layer circuit 40 of each transmitting network device "A" 12*a* and the destination 12*b* can identify, for each transmitted data frame, the associated hash function parameters, including the prescribed source and destination MAC addresses 18*a* and 18*b*, the epochal transmission sequence value 42, and the shared secret value 76.

The MAC translation layer circuit 40 of the transmitting network device "A" 12*a* in operation 68 can determine the next transmission time slot for the transmitting network device "A" 12*a* based on the successively increasing epochal transmission sequence value (e.g., 42*a* of FIG. 5) from the successively-increasing transmission sequence 72, relative to an epochal start time (T=0). In the example of a 6TiSCH implementation, the epochal transmission sequence value 42 can be the ASN sequence number.

Hence, FIG. 5 illustrates that the MAC translation layer circuit 40 of the transmitting network device "A" 12*a* in operation 74 can generate a hashed source MAC address "S=MAC'_A" 14*a* based on the prescribed source MAC address "S=MAC_A" 18*a*, the shared secret value "Si=S1" 76*a*, and the successively-increasing epochal transmission sequence value 42*a* relative to the epochal start time (T=0):

MAC'_A=hash(MAC_A,Si,ASN).

Similarly, FIG. 5 illustrates that the MAC translation layer circuit 40 of the transmitting network device "A" 12*a* in operation 74 can generate a hashed destination MAC address "D=MAC'_B" 14*b* based on the destination MAC address "D=MAC_B" 18*b*, the shared secret value "Si=S1" 76*a*, and the successively-increasing epochal transmission sequence value (e.g., 42*a* of FIG. 5) from the successively-increasing transmission sequence 72 relative to the epochal start time (T=0):

MAC'_B=hash(MAC_B,Si,ASN).

Hence, FIG. 5 illustrates that the MAC translation layer circuit 40 of the transmitting network device "A" 12*a* in operation 74 generates the transmitted data frame 16*a*, having the hashed source MAC address "MAC'_A" 14*a* and the hashed destination MAC address "MAC'_B" 14*b*. The hashed source MAC address 14*a* and the hashed destination MAC address 14*b* are generated based on the MAC translation layer circuit 40 hashing, according to a prescribed hash function 78, the respective prescribed source and destination MAC addresses "MAC_A" 18*a* and 18*b*, the shared secret value "Si=S1" 76*a*, and the epochal transmission sequence value (ASN=20) 42*a*.

The MAC translation layer circuit 40 of the transmitting network device "A" 12*a* in operation 80 outputs the data frame 16*a*, containing the hashed source MAC address 14*a* and hashed destination MAC address 14*b* in place of (i.e., without) the prescribed source MAC address 18*a* and prescribed destination MAC address 18*b*, to the PHY layer circuit 34 for transmission. The PHY layer circuit 34 of the transmitting network device "A" 12*a* in operation 82 transmits the PPDU 48, containing the transmitted data frame 16, at the corresponding time slot associated with the epochal transmission sequence value 42*a*, illustrated as the time slot "ASN=20", at the allocated channel offset "C0".

Hence, the transmitted data frame 16 is transmitted without the prescribed source MAC address 18*a* or the prescribed MAC address 18*b* to ensure that no rogue network device can identify either the transmitting network device "A" 12*a* or the destination network device "B" 12*b*. Hence, the prescribed MAC addresses 18*a* and 18*b* can be hidden from detection by rogue network devices.

The MAC translation layer circuit 40 of the transmitting network device "A" 12*a* in operation 84 also can transmit to the destination network device "B" 12*b*, within the same time slot 42*a*, a second (replacement) secret value "Si=S2" (76*b* of FIG. 5) that replaces (i.e., supersedes) the original secret value "Si=S1" 76*a*, for example in an option field within the same transmitted data frame 16*a*, or within a second data frame 16 transmitted within the same time slot 42*a*. The MAC translation layer circuit 40 can transmit a replacement secret value at each allocated transmission, at prescribed periodic intervals, or at random intervals. If in operation 86 an acknowledgement is not received by the source network device "A" 12*a* from the destination network device "B" 12*b* within the same time slot (e.g., 42*a*), the MAC translation layer circuit 40 of the transmitting network device "A" 12*a* in operation 88 can continue to use the existing shared secret value (e.g., "Si=S1" 76*a*). If in operation 86 an acknowledgement is received by the source network device "A" 12*a* from the destination network device "B" 12*b* within the same time slot (e.g., 42*a*), the MAC translation layer circuit 40 of the transmitting network device "A" 12*a* in operation 90 can begin to use the new shared secret value (e.g., "Si=S2" 76*b*) for the next transmission at the next allocated time slot. The second (replacement) secret value "Si=S2" also can be received by each of the transmitting network device "A" 12*a* and the receiving network device "B" 12*b* from the PCE, for example at periodic intervals or via control messages from the PCE 12.

As illustrated in FIG. 5, the data frame 16*a* transmitted at the epochal transmission sequence value 42*a* and the data frame 16*b* transmitted at the epochal transmission sequence value 42*b* have hashed MAC addresses 14*a*, 14*b* generated based on the secret value "Si=S1" 76*a* (and the respective epochal transmission sequence values 42*a* and 42*b*), whereas the data frame 16*c* transmitted at the epochal transmission sequence value 42*c* has the hashed MAC addresses 14*a*, 14*b* generated based on the secret value "Si=S2" 76*b* (and the corresponding epochal transmission sequence value 42*c*). Hence, the hashed MAC addresses 14 are dynamically generated for each transmitted data frame 16, based on the successively changing epochal transmission sequence values (e.g., 42*a*, 42*b*, and 42*c*), and the changing shared secret values 76*a* and 76*b*.

According to example embodiments, network device security can be maintained in a wireless data network, based on two wireless network devices in a time slot-multiplexed network using dynamically-generated MAC addresses that change at each transmission cycle. The MAC addresses are changed dynamically for each transmission cycle using prescribed hash function parameters that enable a destination network device to recover (or verify) the original MAC addresses prior to hashing.

Although the example embodiments illustrated the transmission of data frames using dynamically hashed MAC addresses in a time-slotted channel hopping network such as 6TiSCH, the example embodiments also can be used in a network that uses time division multiplexing without channel hopping.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   generating, by a transmitting network device, a hashed source media access control (MAC) address and a hashed destination MAC address based on hashing a MAC address of the transmitting network device and a destination MAC address of a destination wireless network device, respectively, relative to an epochal transmission sequence value; and
   transmitting a data frame at a time slot associated with the epochal transmission sequence value, using the hashed source MAC address and the hashed destination MAC address, to the destination wireless network device;
   wherein the generating includes generating a unique hashed source MAC address and a unique hashed destination MAC address for each transmission of a data frame to the destination wireless network device at a corresponding time slot, based on the corresponding epochal transmission sequence value successively increasing for each time slot.

2. The method of claim 1, wherein the data frame is transmitted without the MAC address of the transmitting network device or the destination MAC address.

3. The method of claim 1, wherein the generating is based on hashing the MAC address of the transmitting network device and the destination MAC address, relative to the epochal transmission sequence value, using a secret value shared between the transmitting network device and the destination wireless network device.

4. The method of claim 3, wherein the transmitting includes the transmitting network device sending to the destination wireless network device, during the time slot, a second secret value superseding the secret value and to be used for a subsequent transmission to the destination wireless network device in a subsequent time slot.

5. The method of claim 4, further comprising:
   the transmitting network device receiving, during the time slot, an acknowledgement of the second secret value from the destination wireless network device;
   the acknowledgement causing the transmitting network device to replace the secret value with the second secret value, for generation of the unique hashed source MAC address and the unique hashed destination MAC address based on the second secret value and the corresponding epochal transmission sequence value.

6. The method of claim 3, further comprising receiving the secret value from a controller device distinct from the transmitting network device and the destination wireless network device.

7. The method of claim 1, wherein the transmitting at the time slot is based on a prescribed Time Slotted Channel Hopping (TSCH) schedule allocated to the transmitting network device, relative to the epochal transmission sequence value.

8. An apparatus comprising:
   a first circuit configured for generating a hashed source media access control (MAC) address and a hashed destination MAC address based on hashing a MAC address of the apparatus and a destination MAC address of a destination wireless network device, respectively, relative to an epochal transmission sequence value; and
   a second circuit configured for transmitting a data frame at a time slot associated with the epochal transmission sequence value, using the hashed source MAC address and the hashed destination MAC address, to the destination wireless network device;

wherein the first circuit is configured for generating a unique hashed source MAC address and a unique hashed destination MAC address for each transmission of a data frame to the destination wireless network device at a corresponding time slot, based on the corresponding epochal transmission sequence value successively increasing for each time slot.

9. The apparatus of claim 8, wherein the second circuit is configured for transmitting the data frame without the MAC address of the transmitting network device or the destination MAC address.

10. The apparatus of claim 8, wherein the first circuit is configured for hashing the MAC address of the transmitting network device and the destination MAC address, relative to the epochal transmission sequence value, using a secret value shared between the apparatus and the destination wireless network device.

11. The apparatus of claim 10, wherein the first circuit is configured for causing the second interface circuit to send to the destination wireless network device, during the time slot, a second secret value superseding the secret value and to be used for a subsequent transmission to the destination wireless network device in a subsequent time slot.

12. The apparatus of claim 11, wherein:
the second circuit is configured for receiving, during the time slot, an acknowledgement of the second secret value from the destination wireless network device;
the first circuit is configured for replacing the secret value with the second secret value in response to the acknowledgement, for generation of the unique hashed source MAC address and the unique hashed destination MAC address based on the second secret value and the corresponding epochal transmission sequence value.

13. The apparatus of claim 10, wherein the second circuit is configured for receiving the secret value from a controller device distinct from the transmitting network device and the destination wireless network device, causing the first circuit to store the received secret value.

14. The apparatus of claim 8, wherein the second circuit is configured for transmitting the data frame at the time slot is based on a prescribed Time Slotted Channel Hopping (TSCH) schedule allocated to the apparatus, relative to the epochal transmission sequence value.

15. One or more non-transitory tangible media encoded with logic for execution by a machine, operating as a transmitting network device, and when executed by the machine operable for:
generating, by the transmitting network device, a hashed source media access control (MAC) address and a hashed destination MAC address based on hashing a MAC address of the transmitting network device and a destination MAC address of a destination wireless network device, respectively, relative to an epochal transmission sequence value; and
transmitting a data frame at a time slot associated with the epochal transmission sequence value, using the hashed source MAC address and the hashed destination MAC address, to the destination wireless network device;
wherein the generating includes generating a unique hashed source MAC address and a unique hashed destination MAC address for each transmission of a data frame to the destination wireless network device at a corresponding time slot, based on the corresponding epochal transmission sequence value successively increasing for each time slot.

16. The one or more non-transitory tangible media of claim 15, wherein the data frame is transmitted without the MAC address of the transmitting network device or the destination MAC address.

17. The one or more non-transitory tangible media of claim 15, wherein the generating is based on hashing the MAC address of the transmitting network device and the destination MAC address, relative to the epochal transmission sequence value, using a secret value shared between the transmitting network device and the destination wireless network device.

18. The one or more non-transitory tangible media of claim 15, wherein the transmitting at the time slot is based on a prescribed Time Slotted Channel Hopping (TSCH) schedule allocated to the transmitting network device, relative to the epochal transmission sequence value.

\* \* \* \* \*